April 17, 1962   F. BUTLER ET AL   3,030,291
FUEL ELEMENTS FOR NUCLEAR REACTORS
Filed July 11, 1957   2 Sheets-Sheet 2

United States Patent Office 3,030,291
Patented Apr. 17, 1962

3,030,291
FUEL ELEMENTS FOR NUCLEAR REACTORS
Frank Butler, Knutsford, and John Tatlock, Culcheth, near Warrington, England, assignors to United Kingdom Atomic Energy Authority, London, England
Filed July 11, 1957, Ser. No. 671,351
Claims priority, application Great Britain July 12, 1956
3 Claims. (Cl. 204—193.2)

This invention relates to fuel elements for nuclear reactors and it is concerned with fuel elements for fast reactors which are necessarily very closely spaced when assembled in a core structure.

A problem that arises in a fast reactor core structure is that of keeping the fuel elements uniformly spaced throughout their length by minimising bowing so that the coolant passages between the outer sheaths of adjacent fuel elements do not diminish in size to create local hot spots with aggravation of the bowing of the fuel elements to a point where the sheath fuses due to overheating whilst, at the same time, providing that the elements may be readily discharged from the reactor.

According to the present invention a nuclear reactor fuel element in the from of an elongated body of fissile material enclosed by a protective sheath has a series of bands spaced apart on the sheath, each band comprising a set of regularly spaced helical fins, the fins in any band being co-extensive with the fins in the other bands.

Figure 1:
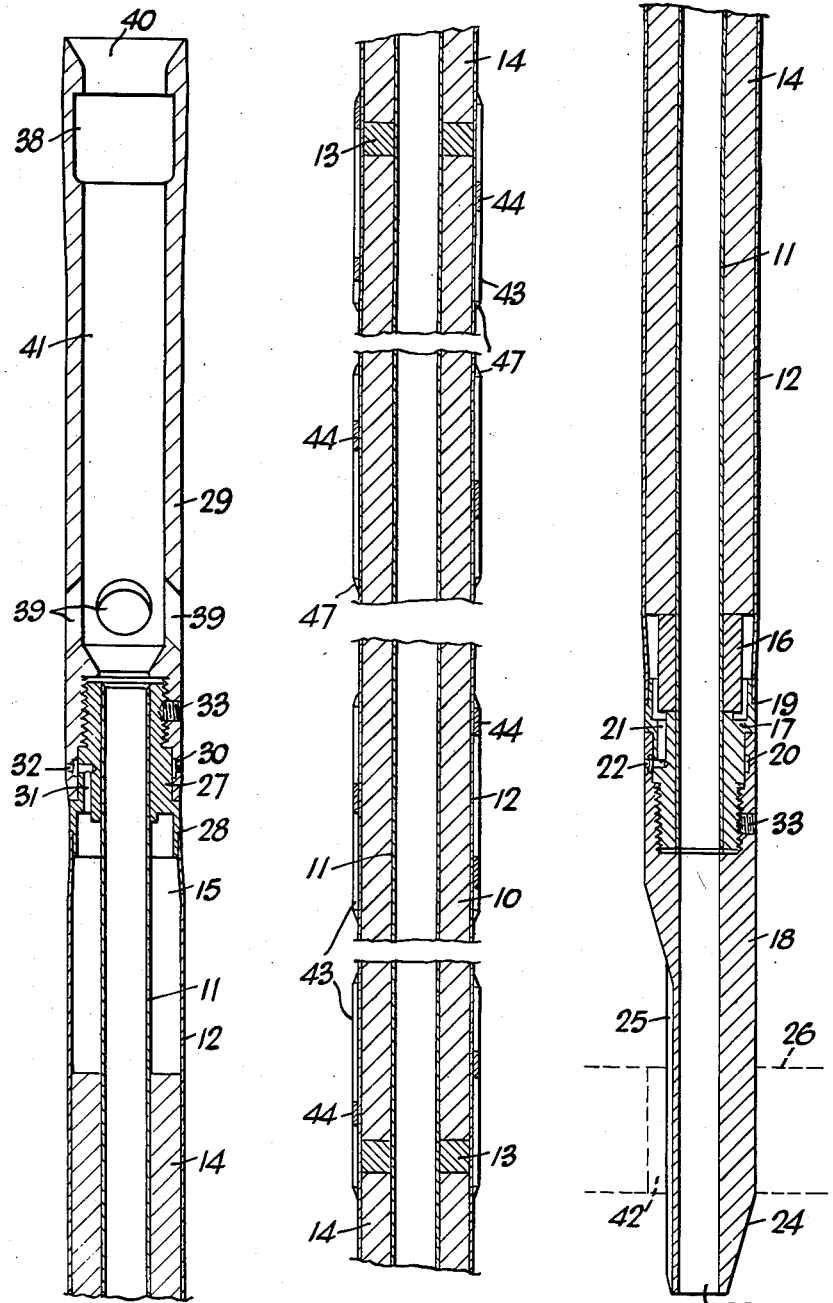
Figure 2:
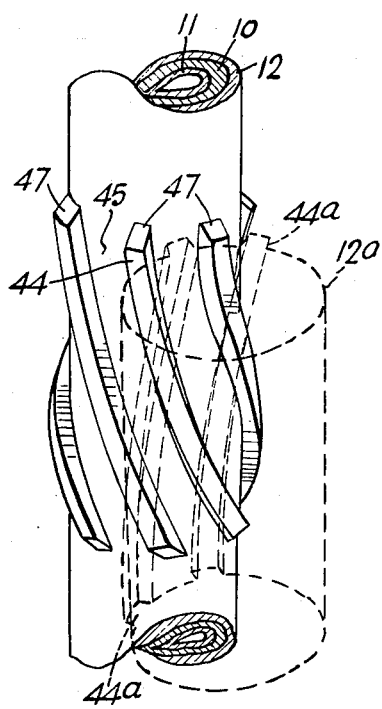
Figure 3:
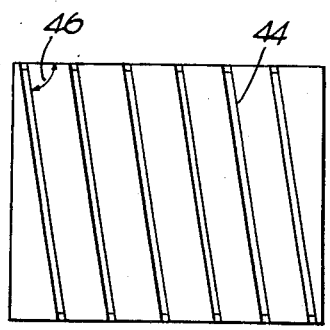

A fuel element according to the invention will now be described with reference to the accompanying drawings wherein FIGS. 1A, 1B and 1C show, in section, the consecutive portions of the fuel element: FIG. 1A being the top end, FIG. 1B the centre portion, and FIG. 1C the bottom end. FIG. 2 is a perspective diagram showing part of two adjacent fuel elements. FIG. 3 is a developed view of one of the bands of fins.

The fuel element comprises enriched uranium fuel 10 (FIG. 1B) of tubular form, an inner vanadium sheath 11 and an outer sheath 12 of niobium. The fuel 10 is contained between two molybdenum washers 13. The outer sheath 12 has bands 43 of integral helical fins 44, each fin 44 having tapered ends 47. The bands 43 are spaced along that part of the outer sheath 12 covering the uranium fuel 10 between the molybdenum washers 13. The fins 44 are co-extensive, so that coolant channels 45 (FIG. 2) formed by adjacent fin pairs 44 in any band 43 are continued in the channels formed by adjacent fin pairs in all other bands 43. The helix angle 46 (FIG. 3) and the length of the bands 43 are such that each fin 44 (FIG. 2) makes contact with two fins 44a on an adjacent fuel element sheath 12a (FIG. 2). (The adjacent fuel element is shown dotted and with two fins only for clarity.)

In manufacturing the outer sheaths 12, longitudinal finning for the whole sheath is achieved using a die, the sheath is then given the necessary twist, and then the unwanted finning is removed by machining.

Above and below the washers 13 there are breeder tubes 14 of natural uranium. A free space 15 (FIG. 1A) exists above the upper tube 14. The lower tube 14 rests on a natural uranium packing tube 16 (FIG. 1C). The packing tube 16 is supported on a niobium end plug 17 which is threaded into a stainless steel bottom end fitting 18. The niobium sheath 12 is argon arc welded to the plug 17 at the line 19. The vanadium sheath 11 rests on the end fitting 18. An annulus 20, duct 21 and pluggable hole 22 are provided for filling the element with liquid sodium metal to improve heat transfer from the fuel to sheaths 11, 12. The end fitting 18 has a bore 23 equal to that of the sheath 11, a taper 24 and three symmetrically placed milled flats 25. A plate for locating the bottom end of the elements is shown by the dotted lines 26. A hole 42 in the plate is indicated.

At the top end of the fuel element there is a niobium end plug 27 (FIG. 1A) argon-arc welded to the sheath 12 along the line 28. The plug 27 is screw fitted in a stainless steel top end fitting 29. An annulus 30, duct 31 and open holes 32 are provided to allow for movement of the liquid sodium metal into and out from the element. Threaded holes 33 are provided in both end fittings 18, 29 for a locking grub screw. An undercut portion 38 provides means for inserting an extracting tool to withdraw the element from the bottom plate. Four holes 39 are provided for feeding coolant to the outside of the tube. Coolant enters the top end fitting 29 at a mouth 40 and divides at the end of a bore 41 in the fitting 29: one part of the coolant issues through the holes 39 and cools the sheath 12 and the other part passes down the sheath 11. At the bottom end of the element the coolant that sweeps the inner sheath 11 passes through the bore 23 and the coolant that sweeps the outer tube passes through the hole 42.

The fuel element is assembled by taking the outer sheath 12, spinning one end over to mate with bottom plug 17 and then welding the sheath 12 to the plug 17 along the line 19. The outer sheath 12 is then filled with packing tube 16, breeder tubes 14, fuel tube 10 and molybdenum washers 13 in the correct order. The other end of the sheath 12 is spun over to mate with end plug 27 and then welded to that end plug. The inner tube 11 is fitted and the end fittings 18 and 29 screwed into place over the plugs 17 and 27 respectively. The element is purged with argon, then evacuated and sodium metal is introduced at the holes 22 which are sealed off after the filling operation has been completed. The holes 32 remain open.

In a typical fuel element, the fuel content 10 is 21" in length and there are four bands 43, each 2" long and each having six spiral fins 44. The four bands 43 are symmetrically spaced about the centre point of the fuel content 10, the distance between the centre points of the inner two bands 43 being 4.5" and the distance between the centre points of the outer two bands 43 being 19.5". The helix angle 46 is 70°. The outer diameter of sheath 12 is 0.75" and the fins 44 are 0.040" wide and 0.034" deep.

The choice of helix angle is governed by two conflicting considerations. On the one hand a small helix angle will tend to increase the coolant pressure drop through the bands 43, whilst a very large helix angle will make contact between fins on adjacent elements erratic or require long bands to give adequate contact. The angle of 70° given above represents a near optimum in a preferred range of 60° to 80°.

In determining the number and spacing of the bands 43 on the outer sheath 12, consideration has to be given to the pressure drop through the bands 43 and to the maximum safe heat transmission with a specified limit of bowing. Optimum conditions appear to be realised with four bands 43, the inner two bands 43 being close together with one on either side of the centre point of the fuel content 10, and the outer two bands 43 being well separated, with one near each end of the fuel content 10.

By providing the spiral fins in bands the discharge of the fuel elements is greatly facilitated as compared with fuel elements having fins over the whole length of the element.

We claim:

1. In a nuclear reactor, a plurality of fuel elements each comprising an elongated body of fissile material mounted within a tubular sheath enclosing said body, said sheath having a series of bands spaced longitudinally along the exterior thereof, each said band comprising a plurality of helical fins equiangularly spaced around the longitudinal axis of said element, the fins of one band being co-extensive with the fins of adjacent bands, the ends of each fin being tapered into said sheath, and each said fin engaging at least two fins of an adjacent fuel element.

2. In a nuclear reactor according to claim 1 wherein the fins have a helix angle in the range of 60–80 degress.

3. In a nuclear reactor, a plurality of fuel elements mounted in close parallel spaced relationship with a passageway extending longitudinally between the elements, each of said elements comprising an elongated body of fissile material and a tubular sheath enclosing the body, said sheath having a series of bands spaced longitudinally along a portion of the exterior thereof, each of the bands being separated from the next band by an annular portion of said passageway and comprising a plurality of helical fins spaced equi-angularly around the longitudinal axis of the element and the ends of which taper into the sheath, the longitudinal dimension of said annular portion being greater than that of the bands, each band of an element being coextensive with a band of an adjacent element and each fin thereof engaging at least two fins of said adjacent element.

References Cited in the file of this patent

UNITED STATES PATENTS

| | | |
|---|---|---|
| 726,901 | Gathmann | May 5, 1903 |
| 1,761,733 | Locke | June 3, 1930 |
| 1,761,981 | Bundy | June 3, 1930 |
| 1,786,571 | Lonsdale | Dec. 30, 1930 |
| 2,428,993 | Reichelderfer | Oct. 4, 1947 |
| 2,841,545 | Zinn | July 1, 1958 |
| 2,848,404 | Treshow | Aug. 19, 1958 |
| 2,870,076 | Koch | Jan. 20, 1959 |

OTHER REFERENCES

International Conference on Peaceful Uses of Atomic Energy, vol. 9, United Nations, N.Y., 1956, pp. 221–230. (Copy in Library.)